(12) United States Patent
Zhang et al.

(10) Patent No.: US 12,434,298 B2
(45) Date of Patent: Oct. 7, 2025

(54) WIRE ARC ADDITIVE MANUFACTURING-SPINNING COMBINED MACHINING DEVICE AND METHOD

(71) Applicant: Huazhong University of Science and Technology, Wuhan (CN)

(72) Inventors: Hai'ou Zhang, Wuhan (CN); Kai Wang, Wuhan (CN); Fusheng Dai, Wuhan (CN); Xushan Zhao, Wuhan (CN); Runsheng Li, Wuhan (CN); Jun Wu, Wuhan (CN); Haitao Yang, Wuhan (CN); Huayu Zhang, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 688 days.

(21) Appl. No.: 17/823,620

(22) Filed: Aug. 31, 2022

(65) Prior Publication Data

US 2023/0072565 A1    Mar. 9, 2023

(30) Foreign Application Priority Data

Aug. 31, 2021   (CN) .......................... 202111009038.1

(51) Int. Cl.
*B33Y 30/00*   (2015.01)
*B21D 22/14*   (2006.01)
*B22F 10/22*   (2021.01)
*B22F 12/00*   (2021.01)
(Continued)

(52) U.S. Cl.
CPC .............. *B22F 10/22* (2021.01); *B21D 22/14* (2013.01); *B22F 12/22* (2021.01); *B33Y 10/00* (2014.12); *B33Y 30/00* (2014.12); *B33Y 40/00* (2014.12)

(58) Field of Classification Search
CPC .......... B22F 10/22; B22F 12/22; B22F 10/38; B22F 2999/00; B22F 10/25; B22F 10/66; B22F 12/37; B21D 22/14; B33Y 10/00; B33Y 30/00; B33Y 40/00; B23K 9/042;
(Continued)

(56) References Cited

U.S. PATENT DOCUMENTS

2020/0001398 A1 *   1/2020   Mellor ................... B23K 26/38

FOREIGN PATENT DOCUMENTS

CN      106694872 A        5/2017
JP      2002127002 A  *    5/2002   ............ H01S 3/067

* cited by examiner

*Primary Examiner* — Tiffany T Tran
(74) *Attorney, Agent, or Firm* — Stanek Lemon Crouse & Meeks, PA (57) ABSTRACT

Wire arc additive manufacturing-spinning combined machining device and method are provided. The machining device includes a spinning mechanism and a fused deposition modeling mechanism. The spinning mechanism includes a machine tool and a spinning head. The spinning head is installed on the machine tool by a main shaft, and the main shaft is configured to drive the spinning head to rotate to achieve the movement in three vertical directions. The spinning head includes a spinning base and balls. Each of the balls is installed in a corresponding one of arc grooves at a bottom of the spinning base. The fused deposition modeling mechanism includes a moving track, a robot and a heat source generator. The arc moving track is arranged around the machine tool in a surrounding mode. The robot is movably installed on the moving track. The heat source generator is installed at a tail end of the robot.

20 Claims, 4 Drawing Sheets

(51) Int. Cl.
   *B33Y 10/00*            (2015.01)
   *B33Y 40/00*            (2020.01)
(58) Field of Classification Search
   CPC ......... B23K 37/06; B23K 9/044; Y02P 10/25; B23P 23/00; B23P 9/02
   See application file for complete search history.

WIRE ARC ADDITIVE MANUFACTURING-SPINNING COMBINED MACHINING DEVICE AND METHOD

CROSS REFERENCE TO RELATED APPLICATION

This patent application claims the benefit and priority of Chinese Patent Application No. 202111009038.1, entitled "WIRE ARC ADDITIVE MANUFACTURING-SPINNING COMBINED MACHINING DEVICE AND METHOD" filed on Aug. 31, 2021, the disclosure of which is incorporated by reference herein in its entirety as part of the present disclosure.

TECHNICAL FIELD

The present disclosure belongs to the field of wire arc additive manufacturing, and in particular relates to wire arc additive manufacturing-spinning combined machining device and method.

BACKGROUND

Wire arc additive manufacturing refers to manufacture three-dimensional solid parts by taking wire arc as a heat source and depositing the materials layer by layer, based on the fusion-deposition principle.

For the traditional plane-based wire arc additive manufacturing, the rolling processes can be combined to achieve the excellent mechanical properties of parts. Most of the existing rolling mechanisms are cylindrical rolls, and the layout of the welding gun and rolling mechanism is not flexible enough, thus only simple weld beads (linear or circular arc weld beads) can be rolled. For the curved-surface wire arc additive manufacturing, the weld bead is no longer a simple weld bead, and the machined surface where the weld bead is located is a curved surface and is difficult to combine with existing rolling process, thus a new rolling mechanism and a method need to be provided.

Spinning process is a machining process for achieving metal plastic molding through a spinning mechanism. The bottom end surface of the spinning mechanism may be a curved surface, and thus the spinning machining of the curved surface can be achieved. Therefore, the spinning process has the potential of being applied to the wire arc additive manufacturing, and a wire arc additive-spinning combined process is achieved. However, the existing spinning mechanism is still hard to combine with the existing wire arc additive manufacturing process. Therefore, there is an urgent need of a spinning mechanism and a method for a curved-surface wire arc additive manufacturing.

SUMMARY

In view of the above defects or improvement demands in the prior art, the present disclosure provides a wire arc additive manufacturing-spinning combined machining device and a method using the same, the purpose of which is to achieve the combination of the wire arc additive manufacturing and the spinning process, and can perform spinning machining on a weld bead with an irregular shape, thus obtaining curved surface parts with excellent surface appearance and mechanical property.

To achieve the above mentioned purpose, in accordance with one aspect of the present disclosure, a wire arc additive manufacturing-spinning combined machining device is provided, which includes a spinning mechanism and a fused deposition modeling mechanism.

The spinning mechanism includes a machine tool and a spinning head. The spinning head is installed on the machine tool by a main shaft, and the main shaft is configured to drive the spinning head to rotate so as to achieve movements in three vertical directions. The spinning head includes a spinning base and balls, and each of the balls is installed in a corresponding one of first arc grooves at a bottom of the spinning base.

The fused deposition modeling mechanism may include a moving track, a robot, and a heat source generator. The moving track may be arranged around the machine tool. The robot is movably installed on the moving track, and the heat source generator may be installed at a tail end of the robot.

In some embodiments, the spinning base may have a cross-sectional radius R satisfying L>2R. L may be determined in such a way that: according to a predetermined curved surface layer of a part, finding out all recessed areas in the predetermined curved surface layer; for each of the all recessed areas, determining a lowest point P of the recessed area, and making a horizontal plane intersecting the recessed area at a height H above the lowest P point so as to obtain a closed contour C which may have a plurality of intersection points with a predetermined machining path; and calculating the diameter of an inscribed circle passing through each intersection point in the closed contour C, respectively. The minimum value may be L.

In some embodiments, the height H may be equal to a height of each of the balls exposed at a lower end of the spinning base plus a height of a weld bead.

In some embodiments, the balls may include three balls, and the three balls may be circumferentially and uniformly installed at the bottom of the spinning base.

In some embodiments, a half of each of the balls may be installed in the corresponding one of the first arc grooves at the bottom of the spinning base. An axis of the ball may be flush with a bottom surface of the spinning base. A supporting piece may be installed on the bottom surface of the spinning base. Second arc grooves are formed in the supporting piece, and each of the second arc grooves is configured to support a corresponding one of the balls.

In some embodiments, a dimension of each portion of the spinning head may be denoted by:

$$\sin\theta = \max\begin{cases} \dfrac{D/2}{\dfrac{D}{2} + m - h + \dfrac{d}{\sin\theta}} \\ \dfrac{D/2}{\dfrac{D}{2} + m + \dfrac{d-h}{\sin\theta}} \end{cases}$$

Where θ may be a maximum curvature angle of a to-be-machined curved surface, D may be the diameter of each of the balls, d may be a thickness of the supporting piece, m is a distance between the ball and an edge of the spinning base, and h may be a distance between a lower end of the supporting piece and an edge of the spinning base.

In some embodiments, the moving track nay be annular or semi-annular.

In accordance with another aspect of the present disclosure, a wire arc additive manufacturing-spinning combined machining method using the machining device above is provided, and includes:

moving the robot along the moving track, and driving the heat source generator to perform metal fused deposition according to a predetermined machining path; driving, by the main shaft, the spinning head to follow the heat source generator and to move along a trajectory of the heat source generator, and rotating the spinning head to roll the metal fused deposition position when a metal material is not completely solidified, thus refining crystal grains and enabling a surface of a formed part to be smooth.

In some embodiments, the heat source generator may be a welding gun. The welding gun may be inclined during machining, and an inclination direction of the welding gun is a traveling direction of a weld bead.

In conclusion, compared with the prior art, the above technical solution conceived through the embodiments have the following main technical effects.

1. The fused deposition mechanism and the spinning mechanism are independent of each other to achieve synchronous fused deposition and rolling of the curved weld beads. The robot is moved using the arc moving track, the forming range is enlarged, the layout is flexible, and the omnidirectional spinning process can be achieved. In addition, the spinning mechanism with the balls is exquisite and simple in design and can be directly installed on the main shaft of the machine tool, so as to achieve the spinning by means of the rotation of the main shaft. Therefore, a wire arc additive-spinning combined process is achieved, a weld bead with an irregular shape can be subjected to spinning machining, and crystal grains can be effectively refined to make the part obtain better mechanical properties. In addition, the surface roughness of the part can be lower, and a better surface appearance is obtained.

2. In order to achieve the combination wire arc additive manufacturing and the spinning process, the spinning process must be carried out following the welding gun, and if the robot is fixed, the spinning process and the welding gun may interfere with each other in the movement process. In accordance with the embodiments, the fused deposition mechanism is enabled to move around the forming area in a wide range through the arc moving track, and, the posture of the welding gun is adjusted to prevent interference.

3. By installing the balls at the bottom of the spinning base, the spinning mechanism is in contact with the workpiece with a spherical surface, and due to the fact that the friction coefficient of the spherical surface is low, the surface roughness of the obtained part is low, that is, the surface appearance is better.

4. When employing the curved surface layer, the welding gun and the spinning head move along a curved surface path, and the welding gun and the spinning head may collide with the forming surface. The collision problem of the welding gun may be prevented by changing the posture of the welding gun. But for the spinning head, a method for pre-determining possible collision points of the spinning head and curved surface layer is provided, and the dimension of the spinning base is designed accordingly to prevent collision during spinning.

5. The stability is improved by designing the supporting piece to support the balls. In addition, the maximum curvature formula of a machinable curved surface of the spinning mechanism is given, the dimensions of various portions of the spinning head are designed accordingly, thus guaranteeing that the designed spinning head can machine the curved surface within a large curvature range.

Throughout the drawings, like reference numerals are used to refer to like elements or structures. List of the reference characters: 11 heat source generator; 12 spinning head; 13 main shaft; 14 base; 23 spinning base; 24 ball; 41 machine tool; 42 worktable; 43 robot; 431 first limit position; 432 second limit position; and 433 moving track.

DETAILED DESCRIPTION OF THE EMBODIMENTS

To make the objective, the technical solution and advantages of the present disclosure more clearly, the following further describes the present disclosure in detail with reference to the accompanying drawings and embodiments. It should be understood that the specific embodiments described herein are merely illustrative of the present disclosure rather than limiting the present disclosure. In addition, the technical features involved in the various embodiments of the present disclosure described below may be combined with each other as long as they do not conflict with each other.

In accordance with a wire arc additive manufacturing-spinning combined machining device provided by an embodiment of the present disclosure, the wire arc additive manufacturing forming is achieved while a weld bead with an irregular shape is subjected to spinning machining, such that the parts can obtain better surface appearance and mechanical property. The weld bead with the irregular shape includes a linear weld bead or a curved welded bead, a machining surface where the weld bead is located may be a plane or a curved surface with a certain curvature (the plane is a particular curved surface, hereinafter collectively referred to as the curved surface).

Figure 1:
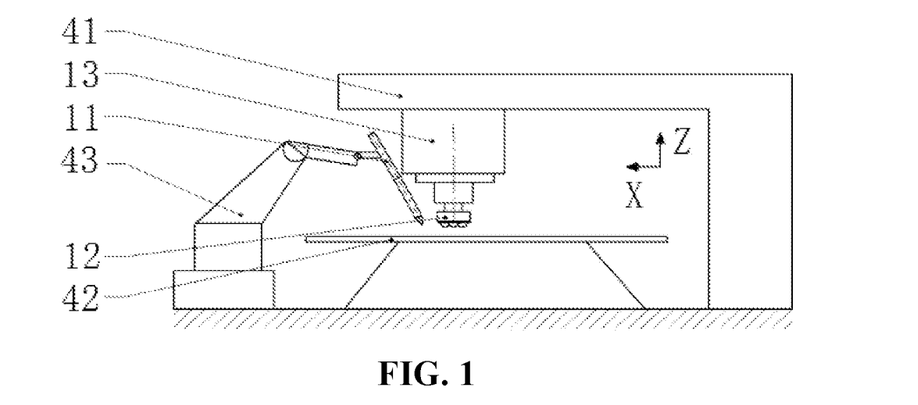
FIG. 1 is a front view of a structure of a wire arc additive manufacturing-spinning combined machining device in accordance with an embodiment of the present disclosure.
Figure 2:
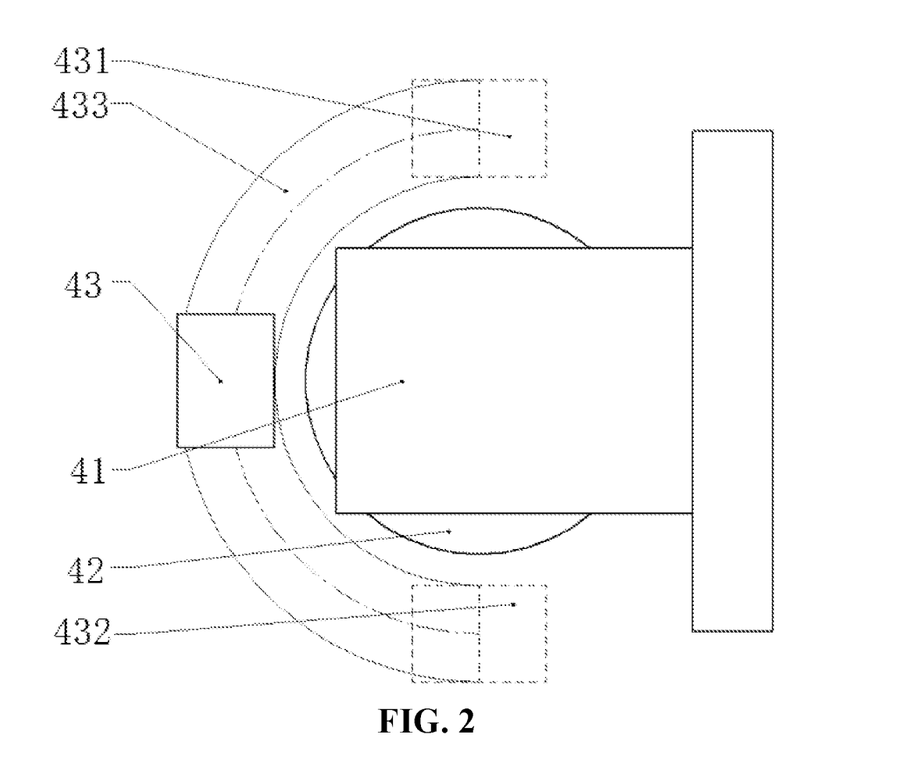
FIG. 2 is a top view of the structure of the wire arc additive manufacturing-spinning combined machining in accordance with the embodiment of the present disclosure.

As shown in FIG. 1 and FIG. 2, the wire arc additive manufacturing-spinning combined machining device includes a spinning mechanism and a fused deposition modeling mechanism.

The spinning mechanism includes a machine tool 41 and a spinning head 12. The spinning head 12 is installed on the machine tool 41 by a main shaft 13. The main shaft 13 is configured to drive the spinning head 12 to rotate so as to achieve movements in X, Y, and Z directions. The spinning head 12 includes a spinning base 23 and balls 24. Each of the balls 24 is installed in a corresponding one of circular arc grooves at a bottom of the spinning base 23.

The fused deposition modeling mechanism includes a moving track 433, a robot 43, and a heat source generator 11. The moving rack 43 is annular or semi-annular, and is arranged around the machine tool 41. A specific arrangement method of the moving rack 43 needs to be determined according to the dimension and a machining area of the machine tool. The robot 43 is movably installed on the moving track 433. One end of the moving track is a first limit position 431, and the other end of the moving track is a second limit position 432. The robot may move between the first limit position 431 and the second limit position 432. The heat source generator 11 is installed at a tail end of the robot 43, and the heat source generator 11 is specifically a welding gun.

Preferably, the balls 24 includes three balls, and the three balls 24 are circumferentially and uniformly installed at the bottom of the spinning base 23. A half of each of the balls 24 is installed in the corresponding one of the circular arc grooves at the bottom of the spinning base 23, that is, an axis of the ball 24 is flush with a bottom surface of the spinning base 23. A supporting piece is installed at the bottom of the spinning base 23, and the three balls 24 are respectively supported by three arc grooves on the supporting piece and are placed in the circular arc grooves of the spinning base 23.

Further, before the wire arc additive manufacturing, a three-dimensional model of a part should be layered, and the height of each layer is the height of one layer produced by the wire arc additive manufacturing (namely the height of a weld bead). and then, the planning of the path (i.e., the traveling path of the welding gun) is carried out layer by layer. When the planar layer is adopted, the welding gun and the spinning head move along a plane path without generating interference. However, when the curved surface layer is adopted, the welding gun and the spinning head move along a curved path, and the welding gun and the spinning head may collide with a forming surface. The collision problem of the welding gun may be prevented by changing a posture. But for the spinning head, it is necessary to determine collision points of the spinning head and curved surface layer in advance, and design the dimension of the spinning base accordingly.

Based on the shape characteristics of the spinning head, the recessed portions of the curved surface layer is most likely to interfere with the spinning head. As shown in FIG. 5A to FIG. 7, firstly, all recessed areas of the curved surface layer are found out, for a certain recessed area 22 through which a Path passes, the lowest point of the recessed area is P, a horizontal plane is made at a certain height H above the lowest point P to intersect with the recessed area Q, and thus a closed contour C is obtained. The Path has multiple intersection points with the closed contour C. At an intersection point Q, if the diameter L of the smallest inscribed circle padding through the intersection point Q in the closed contour C is smaller than the diameter of the supporting piece, the spinning head is bound to collide with the forming surface. Therefore, for the diameter L of the minimum inscribed circle, the cross-sectional radius R of the spinning base 23 should satisfy L>2R. The height H is a height of an exposed portion of the ball below the supporting piece plus a height of a layer of the weld bead, that is, the height H is equal to a sum of D/2-d and the height of the weld bead, wherein D is the diameter of the ball, d is the thickness of the supporting piece.

Figure 3:
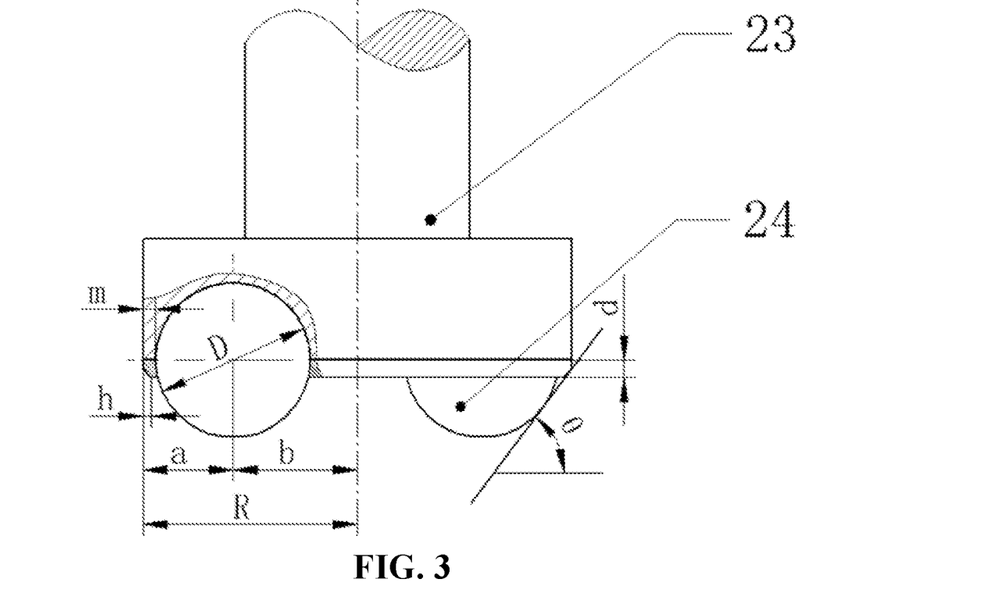
FIG. 3 is a schematic diagram of the structure and the dimension of a spinning mechanism in accordance with the embodiment of the present disclosure.

Furthermore, in order to guarantee that the designed spinning head 12 can be configured to perform curved surface machining in a large curvature range, as shown in FIG. 3, a dimension of each portion of the spinning head 12 is denoted by, such that the curved surface is tangent to the balls 24 and the curved surface is prevented from colliding with the edge of the supporting piece:

$$\sin\theta = \max\begin{cases} \dfrac{D/2}{\dfrac{D}{2}+m-h+\dfrac{d}{\sin\theta}} \\ \dfrac{D/2}{\dfrac{D}{2}+m+\dfrac{d-h}{\sin\theta}} \end{cases}$$

Where θ is the maximum curvature angle of a to-be-machined curved surface, D is the diameter of the ball, d is the thickness of the supporting piece, m is a distance between the ball and the edge of the spinning base, and h is a distance between the lower end of the supporting piece and the edge of the spinning base.

Figure 4:
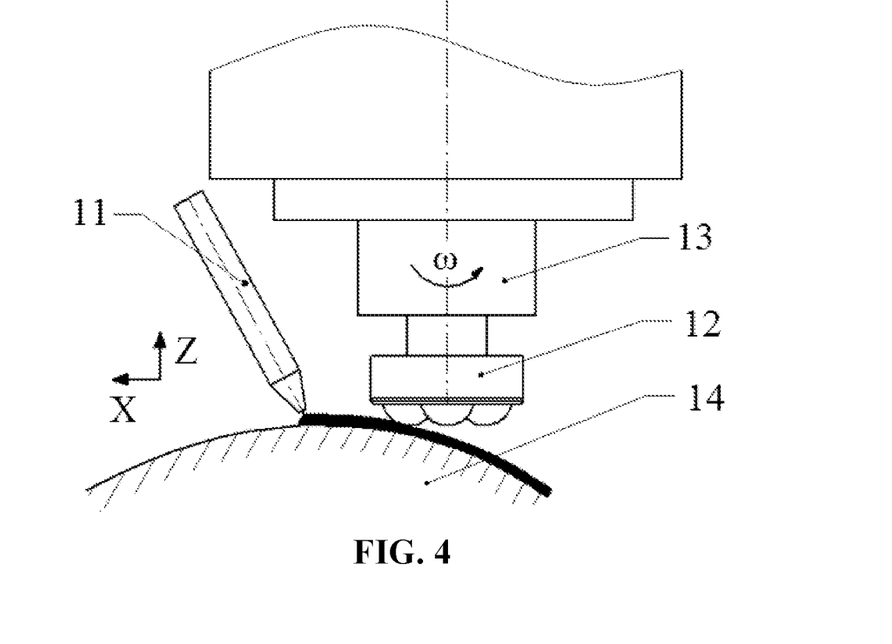
FIG. 4 is an overall schematic diagram in the process of the wire arc additive manufacturing in accordance with the embodiment of the present disclosure.
Figure 5A:
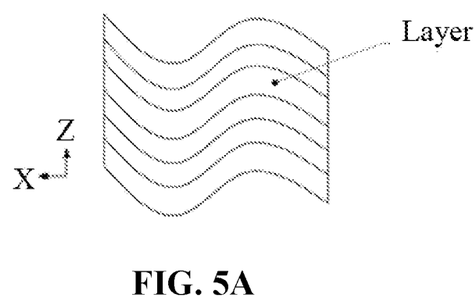
FIG. 5A is a schematic diagram of part layer in accordance with the embodiment of the present disclosure.
Figure 5B:
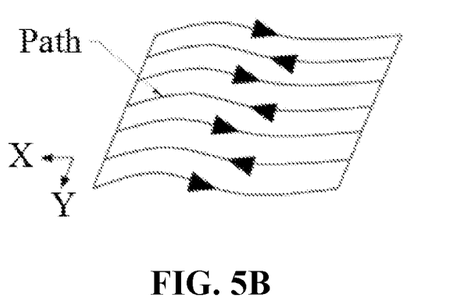
FIG. 5B is a schematic diagram of path planning in accordance with the embodiment of the present disclosure.
Figure 6A:
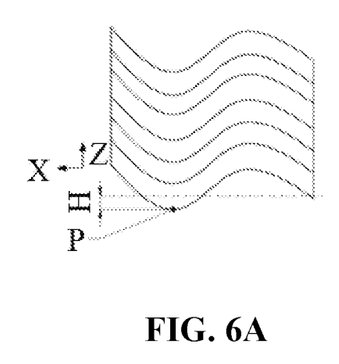
FIG. 6A is a schematic diagram illustrating a feasibility analysis in accordance with the embodiment of the present disclosure.
Figure 6B:
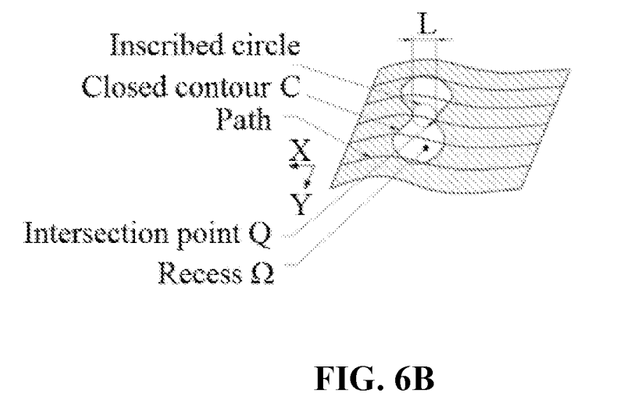
FIG. 6B is another schematic diagram illustrating a feasibility analysis in accordance with the embodiment of the present disclosure.
Figure 7:
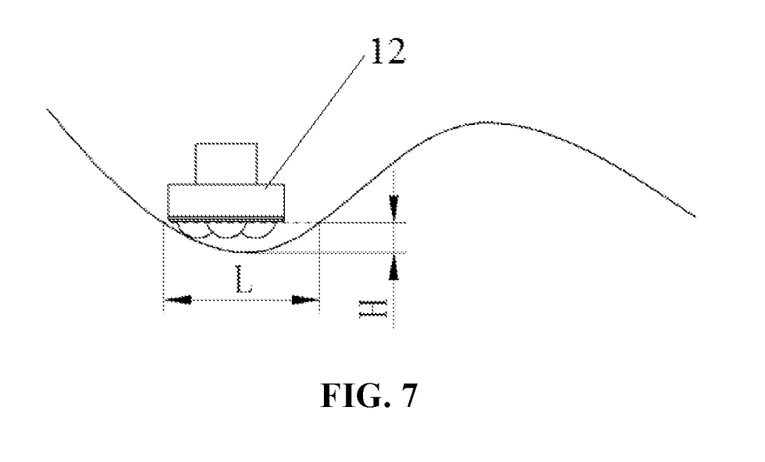
FIG. 7 is a schematic diagram illustrating a collision analysis in accordance with the embodiment of the present disclosure.

A method for performing shape machining of the part by using the wire arc additive manufacturing-spinning combined machining device, as shown in FIG. 4, includes the following steps.

The robot 43 moves along the moving track 433 and drives the welding gun to perform metal fused deposition layer by layer on a worktable 42 in a predetermined machining path. The spinning head 12 follows the heat source generator 11 at a suitable distance behind and moves along a trajectory of the heat source generator 11, and is driven by the main shaft 13 to rotate rapidly. When the metal material deposited by the welding gun is not completely solidified, the spinning head 12 rotates rapidly and rolls the metal fused deposition position to refine crystal grains, and make the surface of the part smoother. The part obtained by the additive manufacturing is printed on a base 14, and after the machining is finished, the printed part is separated from the base 14 by using techniques such as wire cutting.

Specifically, if the spinning head is far away from the welding gun, the temperature of the weld bead is low when being rolled, the strength of the weld bead is high, and the rolling effect is not obvious. If the spinning head is close to the welding gun, the interference is prone to occur. To guarantee the rolling effect and avoid interference, the welding gun needs to be properly inclined, and an inclination direction of the welding gun is a traveling direction of the weld bead. For the linear weld bead, it is only necessary to keep the posture of the welding gun during printing. For the curved weld bead, the welding direction needs to be changed continuously. In order to keep an included angle between the inclination direction and the welding direction, the posture of the welding gun can be changed from time to time by changing the posture of a six-axis machine. If the curvature of the curve is large, it may exceed the travel range of the robot arm. By using the arc moving track around the machine tool, the robot is installed on the moving track to move in a wide range, thus solving the over-travel problem.

It will be readily understood by those skilled in the art that the foregoing is only a preferred embodiment of the present disclosure and is not intended to limit the present disclosure, and that any modifications, equivalent replacements and improvements made within the spirit and principles of the present disclosure shall be included within the scope of protection of the present disclosure.

What is claimed is:

1. A wire arc additive manufacturing-spinning combined machining device, the device comprising a spinning mechanism and a fused deposition modeling mechanism, wherein
the spinning mechanism comprises a machine tool (41) and a spinning head (12), wherein the spinning head (12) is installed on the machine tool (41) by a main shaft (13), the main shaft (13) is configured to drive the spinning head (12) to rotate so as to achieve movements in three vertical directions; the spinning head (12) comprises a spinning base (23) and balls (24), and each of the balls (24) is installed in a corresponding one of first arc grooves at a bottom of the spinning base (23);
the fused deposition modeling mechanism comprises a moving track (433), a robot (43), and a heat source generator (11), wherein the are moving track (433) is arranged around the machine tool (41), the robot (43) is movably installed on the moving track (433), and the heat source generator (111) is installed at a tail end of the robot (43).

2. The wire arc additive manufacturing-spinning combined machining device according to claim 1, wherein the spinning base (23) has a cross-sectional radius R satisfying L>2R, wherein L is determined in such a way that: according to a predetermined curved surface layer of a part, finding out all recessed areas in the predetermined curved surface layer; for each of the all recessed areas, determining a lowest point P of the recessed area, and making a horizontal plane intersecting the recessed area at a height H above the lowest P point so as to obtain a closed contour C which has a plurality of intersection points with a predetermined machining path; and calculating a diameter of an inscribed circle passing through each of the intersection points in the closed contour C, respectively, wherein a minimum value of the diameter is L.

3. The wire arc additive manufacturing-spinning combined machining device according to claim 2, wherein the height H is equal to a height of each of the balls (24) exposed at a lower end of the spinning base (23) plus a height of a weld bead.

4. The wire arc additive manufacturing-spinning combined machining device according to claim 3, wherein the moving track (433) is annular or semi-annular.

5. The wire arc additive manufacturing-spinning combined machining device according to claim 2, wherein the moving track (433) is annular or semi-annular.

6. The wire arc additive manufacturing-spinning combined machining device according to claim 1, wherein the balls (24) comprise three balls, and the three balls (24) are circumferentially and uniformly installed at the bottom of the spinning base (23).

7. The wire arc additive manufacturing-spinning combined machining device according to claim 6, wherein a half of each of the balls (24) is installed in the corresponding one of the first arc grooves at the bottom of the spinning base (23), an axis of the ball (24) is flush with a bottom surface of the spinning base (23); a supporting piece is installed on the bottom surface of the spinning base (23), second arc grooves are formed in the supporting piece, and each of the second arc grooves is configured to support a corresponding one of the balls (24).

8. The wire arc additive manufacturing-spinning combined machining device according to claim 7, wherein a dimension of each portion of the spinning head (12) is denoted by:

$$\sin\theta = \max\begin{cases} D/2 \\ \dfrac{D}{2} + m - h + \dfrac{d}{\sin\theta} \\ \dfrac{D/2}{\dfrac{D}{2} + m + \dfrac{d-h}{\sin\theta}} \end{cases}$$

wherein θ is a maximum curvature angle of a to-be-machined curved surface, D is a diameter of each of the balls, d is a thickness of the supporting piece, m is a distance between the ball and an edge of the spinning base, and h is a distance between a lower end of the supporting piece and an edge of the spinning base.

9. The wire arc additive manufacturing-spinning combined machining device according to claim 8, wherein the moving track (433) is annular or semi-annular.

10. The wire arc additive manufacturing-spinning combined machining device according to claim 7, wherein the moving track (433) is annular or semi-annular.

11. The wire arc additive manufacturing-spinning combined machining device according to claim 6, wherein the moving track (433) is annular or semi-annular.

12. The wire arc additive manufacturing-spinning combined machining device according to claim 1, wherein the moving track (433) is annular or semi-annular.

13. A wire arc additive manufacturing-spinning combined machining method using a wire arc additive manufacturing-spinning combined machining device, the wire arc additive manufacturing-spinning combined machining device comprising a spinning mechanism and a fused deposition modeling mechanism, wherein
the spinning mechanism comprises a machine tool (41) and a spinning head (12), wherein the spinning head (12) is installed on the machine tool (41) by a main shaft (13), the main shaft (13) is configured to drive the spinning head (12) to rotate so as to achieve movements in three vertical directions; the spinning head (12) comprises a spinning base (23) and balls (24), and each of the balls (24) is installed in a corresponding one of first arc grooves at a bottom of the spinning base (23);
the fused deposition modeling mechanism comprises a moving track (433), a robot (43), and a heat source generator (11), wherein the moving track (433) is arranged around the machine tool (41), the robot (43) is movably installed on the moving track (433), and the heat source generator (111) is installed at a tail end of the robot (43); and
the method comprising:
moving the robot (43) along the moving track (433), and driving the heat source generator (11) to perform metal fused deposition according to a predetermined machining path; driving, by the main shaft (13), the spinning head (12) to follow the heat source generator (11) and to move along a trajectory of the heat source generator (11), and rotating the spinning head (12) to roll the metal fused deposition position when a metal material is not completely solidified, thus refining crystal grains and enabling a surface of a formed part to be smooth.

14. The wire arc additive manufacturing-spinning combined machining method according to claim 13, wherein the heat source generator (11) is a welding gun; the welding gun is inclined during machining, and an inclination direction of the welding gun is a traveling direction of a weld bead.

15. The wire arc additive manufacturing-spinning combined machining method according to claim 13, wherein the spinning base (23) has a cross-sectional radius R satisfying L>2R, wherein L is determined in such a way that: according to a predetermined curved surface layer of a part, finding out all recessed areas in the predetermined curved surface layer; for each of the all recessed areas, determining a lowest point P of the recessed area, and making a horizontal plane intersecting the recessed area at a height H above the lowest P point so as to obtain a closed contour C which has a plurality of intersection points with a predetermined machining path; and calculating a diameter of an inscribed circle passing through each of the intersection points in the closed contour C, respectively, wherein a minimum value of the diameter is L.

16. The wire arc additive manufacturing-spinning combined machining method according to claim 15, wherein the height H is equal to a height of each of the balls (24) exposed at a lower end of the spinning base (23) plus a height of a weld bead.

17. The wire arc additive manufacturing-spinning combined machining method according to claim 13, wherein the balls (24) comprise three balls, and the three balls (24) are circumferentially and uniformly installed at the bottom of the spinning base (23).

18. The wire arc additive manufacturing-spinning combined machining method according to claim 17, wherein a half of each of the balls (24) is installed in the corresponding one of the first arc grooves at the bottom of the spinning base (23), an axis of the ball (24) is flush with a bottom surface of the spinning base (23); a supporting piece is installed on the bottom surface of the spinning base (23), second arc grooves are formed in the supporting piece, and each of the second arc grooves is configured to support a corresponding one of the balls (24).

19. The wire arc additive manufacturing-spinning combined machining method according to claim 18, wherein a dimension of each portion of the spinning head (12) is denoted by:

$$\sin\theta = \max\begin{cases} \dfrac{D/2}{\dfrac{D}{2}+m-h+\dfrac{d}{\sin\theta}} \\ \dfrac{D/2}{\dfrac{D}{2}+m+\dfrac{d-h}{\sin\theta}} \end{cases}$$

wherein θ is a maximum curvature angle of a to-be-machined curved surface, D is a diameter of each of the balls, d is a thickness of the supporting piece, m is a distance between the ball and an edge of the spinning base, and h is a distance between a lower end of the supporting piece and an edge of the spinning base.

20. The wire arc additive manufacturing-spinning combined machining method according to claim 13, wherein the moving track (433) is annular or semi-annular.

* * * * *